United States Patent [19]

Hasegawa et al.

[11] Patent Number: 4,785,405

[45] Date of Patent: Nov. 15, 1988

[54] POWER SYSTEM STABILIZER

[75] Inventors: Taizo Hasegawa, Aichi; Hirotaka Ono, Gifu; Isao Koda, Aichi; Tadahiro Gouda, Hyogo; Hideharu Oshida, Hyogo; Toshiharu Narita, Hyogo, all of Japan

[73] Assignees: Chubu Electric Power Company, Inc.; Mitsubishi Denki Kabushiki Kaisha, both of Tokyo, Japan

[21] Appl. No.: 378

[22] Filed: Jan. 5, 1987

[30] Foreign Application Priority Data

Jan. 6, 1986 [JP] Japan .................................. 61-433

[51] Int. Cl.⁴ ...................... G06F 15/20; G06F 15/56
[52] U.S. Cl. .................................... 364/480; 307/102; 322/21; 322/58; 361/20; 364/492
[58] Field of Search .................... 307/102; 322/21, 25, 322/58; 361/20; 364/492, 494, 550, 480

[56] References Cited

U.S. PATENT DOCUMENTS

| | | | |
|---|---|---|---|
| 4,080,559 | 3/1978 | Wright et al. | 361/20 |
| 4,214,289 | 7/1980 | Otsuka et al. | 361/20 |
| 4,311,253 | 1/1982 | Putman et al. | 322/25 |
| 4,410,848 | 10/1983 | Frierdich | 361/20 |
| 4,410,950 | 10/1983 | Toyoda et al. | 364/492 |
| 4,463,306 | 7/1984 | de Mello et al. | 322/25 |
| 4,663,539 | 5/1987 | Sharp et al. | 364/492 |
| 4,701,689 | 10/1987 | Yuan et al. | 307/102 |

OTHER PUBLICATIONS

Matuoka et al., "The Protective Relaying System for Preventing Power Failure Extension in Bulk Power Systems", International Conference on Large High Voltage Electric Systems, Sep. 1-9, 1982, pp. 1-7.

Primary Examiner—Parshotam S. Lall
Assistant Examiner—Kevin J. Teska
Attorney, Agent, or Firm—Bernard, Rothwell & Brown

[57] ABSTRACT

The power system stabilizer is provided at an individual power system to be separated due to an accident cutting off a link line which interconnects a number of power systems to form a large-scale power system. The power systems include power stations such as power plants and transformer substations. A simplified arithmetic processing unit of the stabilizer performs an arithmetic processing by a simple linear equation using an output frequency of a representative power station belonging to the separated power system immediately after the accident has been cleared, so that a total load drop of the separated power system can be assumed. Based on the assumption amount, balance control of demand and supply in the separated system is made.

6 Claims, 8 Drawing Sheets

POWER SYSTEM STABILIZER

BACKGROUND OF THE INVENTION

1. Field of the Invention

The present invention relates to a power system stabilizer provided at an individual power system to be separated due to an accident cutting off a link line which interconnects a number of power systems, which include power stations such as power plants, transformer substations and loads, to form a large-scale power system (main system) and, more particularly, to a power stabilizer for enabling high accuracy control of a demand-supply balance in the separated power system by assuming a load-drop amount due to a voltage drop caused by the accident when the individual power system is separated from the main system.

2. Description of the Prior Art

Conventionally, for this kind of power system stabilizer, there has been proposed a power system stabilizer as described on pages 5 and 6 of a paper titled "The Protective Relaying System for Preventing Power Failure Extension in Bulk Power System", published in the International Conference on Large High Voltage Electric Systems held on Sept. 1 to 9, 1982.

The above-mentioned power system stabilizer is constructed as shown in FIG. 1. In the drawing, a whole system comprises a transformer substation 1 belonging to a main system side; a central transformer substation 2 in a separated system to be controlled; a power plant 3 similarly belonging to the same separated system. These substations and plant are interconnected via power lines 4 and 5. A reference numeral 30a shows a group of loads placed out of control and a reference numeral 30b denotes a group of loads to be controlled. A system stabilizer 6 is installed at the central transformer substation 2 and comprises an input conversion circuit 61a for measuring load power, an input conversion circuit 61b for measuring a tidal current of a link line, an input conversion circuit 61c for measuring a (power) generator output, a route-disconnection detector 62, an arithmetic processing unit 63 employing a microprocessor, a stopper 64, a trip-signal output circuit 65, an input conversion circuit 67 for measuring load voltages, etc.

Next, the operation of the whole system will be described. Current and voltage data detected by sensors 23, 24 and 32, each of which is made up of a current transformer C.T and a instrument transformer P.T, are given to the system stabilizer 6 through control cables 25 and 27 and a communication route 33. On the basis of these data, the input conversion circuits 61a, 61b and 61c, each of which comprises a filtering circuit for eliminating a harmonic component and a transient oscillation component, etc., an effective power converter for deriving effective power, an analog-to-digital (A/D) converter for converting an analogue amount into a digital one, etc., calculate the effective power components of loads to be broken and the output (effective force) of the generator and send them, after being converted into digital amounts, to the processing unit 63. Further, a load voltage $V_L$ detected by a sensor 28, which is composed of an instrument transformer PT, is converted into a digital amount at the input conversion circuit 67 comprising a filtering circuit, an A/D converter, etc. to be output to the unit 63. Opening and closing information of (circuit) breakers 11 and 21 sent through a control cable 26 and a communication route 12 is produced to the unit 63 after being converted into digital information at the route-disconnection detector 62. In the case where a route-disconnection accident has taken place in the link line with the main system and it has been detected that an object system is brought into a single operation state using those data, the arithmetic processing unit 63 performs stabilizing control according to a flow chart shown in FIG. 2.

The flow chart shown in FIG. 2 comprises a starting block 70 for starting the stabilizing control after the occurrence of a route disconnection between the main system and the local system has been detected; a judgement block 71 for judging whether a load voltage $V_L$ is larger than a reference value $V_{ref}$; a processing block 72 for selecting a load at the i-th stage when the load voltage is smaller than $V_{ref}$, i.e., $V_L < V_{ref}$; a processing block 73 for carrying out load-breaking Pc(i), at the i-th stage where Pc(i) is set at such a value that no overcontrol takes place even when a load drop occurs due to a voltage drop; a processing block 74 for judging whether $V_L$ is larger than $V_{ref}$; a processing block 75 for selecting a load at the (i +1)th stage; a processing block 76 for calculating a total load-drop amount Pdrop by applying a method of least squares from $$P_L{}^* = [P_{LP}{}^* P_{LI}{}^* P_{LZ}{}^*]^t \qquad (1)$$
$$= (V_L{}^t R^{-1} V_L)^{-1} (V_L{}^t R^{-1}) P_G$$

$$Pdrop^* = \text{(total load before separation)} - \qquad (2)$$
$$(P_{LP}{}^* + P_{LI}{}^* + P_{LZ}{}^*)$$

where $$P_G = [P_{G1} P_{G2} \ldots P_{Gn}]^t$$

$$V_L = \begin{bmatrix} 1 & V_{L1} & V_{L1}^2 \\ 1 & V_{L2} & V_{L2}^2 \\ \cdot & \cdot & \cdot \\ \cdot & \cdot & \cdot \\ \cdot & \cdot & \cdot \\ 1 & V_{Ln} & V_{Ln}^2 \end{bmatrix}$$

$$P_L{}^* = [P_{LP} P_{LI} P_{LZ}]^t;$$

a processing block 77 for calculating a load-breaking amount Pc·ter at the final stage from Pc·ter =Ps−Pdrop; a processing block 78 for executing the load-breaking depending on the load-breaking amount Pc·ter; and a control completion block 79. It is to be noted that the Vref in the judgement blocks 71 and 74 is such a value that no load drop occurs when the load voltage $V_L$ is recovered to a value larger than the $V_{ref}$, and is selected to be a value of 0.8 to 0.9 p.u. almost close to a stationary value.

Since the conventional system stabilizer is constructed as mentioned above, a voltage of a load node is needed as on-line data, and consequently the stabilizer can easily be applied to one station-one node system in the above-mentioned example. However, its application into a system having a number of load transformer substations is difficult, because each load-node voltage varies diversely after an accident has been cleared. Also, since the assumption equations of a weighting method of least squares are quite complicated as shown in Equations (1) and (2), a microprocessor of high performance is needed to achieve the method without affecting a quick response, resulting in problems such as an increase in a manufacturing cost.

SUMMARY OF THE INVENTION

An object of the invention is to provide a power system stabilizer capable of assuming a load-drop amount based on a simplified assumption equation without employing a load node voltage and applicable to a system having a number of stations and nodes.

Another object of the invention is to provide a power system stabilizer capable of an arithmetic operation of the load drop with a quick response based on the assumption by the use of the simplified assumption equation even if arithmetic processing means with a simplified structure is applied as well as to provide a power system stabilizer with an inexpensive manufacturing cost since the arithmetic operation based on the assumption can be achieved without employing a microprocessor of high performance.

To achieve the above-mentioned objects, the power system stabilizer of the present invention performs the assumption of a total load-drop amount of a separated power system on the basis of a simple linear equation, or an equation of the first degree by using a frequency at a representative power station included in the separated power system after an accident occurring in a link line, etc. has been cleared, and then controls a demand-supply power balance based on said assumption amount.

DETAILED DESCRIPTION OF THE PREFERRED EMBODIMENTS

An embodiment of a power system stabilizer of the present invention will be described hereunder.

Figure 1:
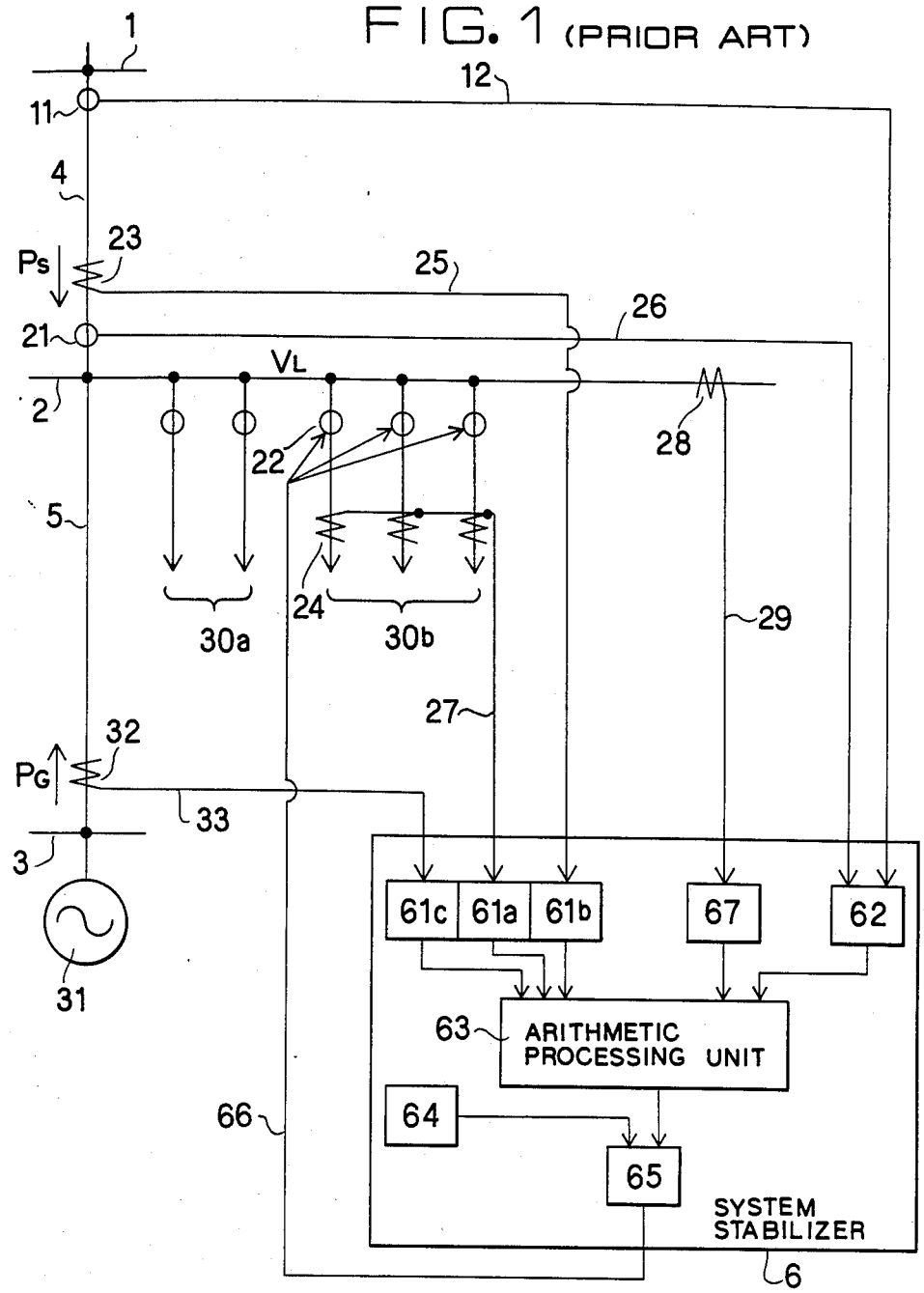
FIG. 1 is a schematic diagram of a power system stabilizer to which a conventional load-drop-amount assumption method is applied.
Figure 2:
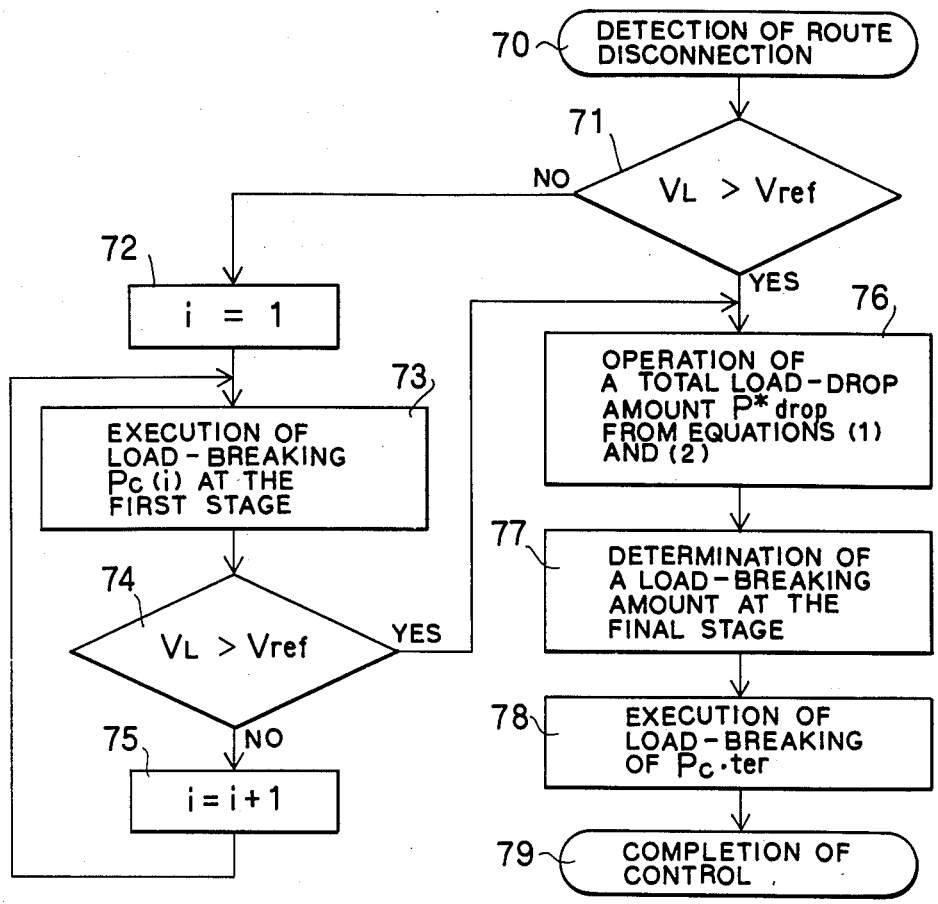
FIG. 2 is a processing flow chart for describing the operation process at the arithmetic processing unit of the power system stabilizer of FIG. 1.
Figure 3:
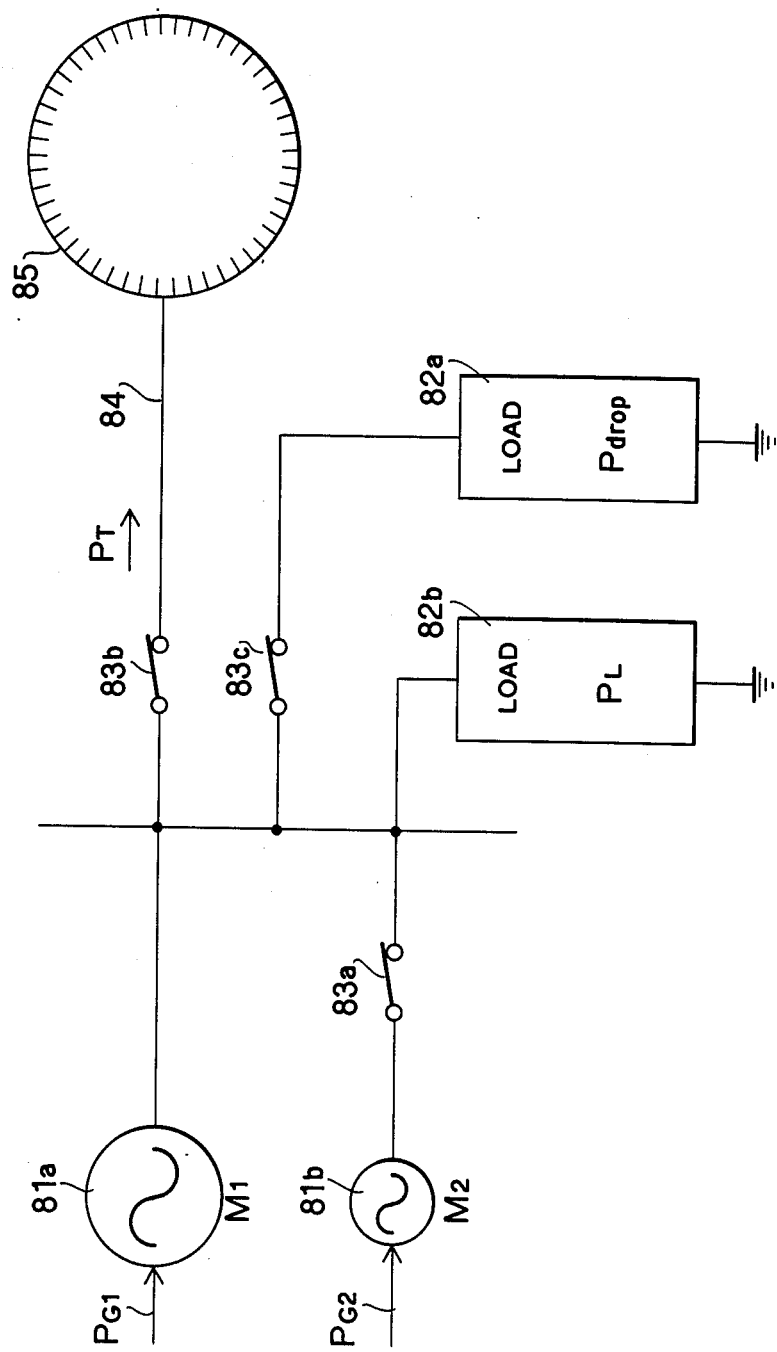
FIG. 3 shows a model system diagram for describing a basic principle of a power system stabilizer of the invention.

First, a basic principle of the invention will be described referring to FIG. 3. In FIG. 3, a reference numeral 81a denotes a generator obtained by equivalently organizing a group of generators placed out of control at the first stage in a separated system, while a reference numeral 81b denotes a generator obtained by equivalently organizing a group of generators to be controlled at the first stage in the separated system. A reference numeral 82a represents a load obtained by equivalently organizing loads that drop during an accident in the separated system, whereas a reference numeral 82b represents a load obtained by equivalently organizing the remaining loads in the separated system. A reference numeral 83a shows a switch for equivalently simulating generator-breaking at the first stage, a reference numeral 83b shows a switch for equivalently simulating of a route disconnection of a link line, and a reference numeral 83c shows a switch for equivalently simulating a load drop during the accident. A reference numeral 84 denotes a power line for interconnecting the separated system and a main system, and a reference numeral 85 indicates the main system. In this case, the generator-breaking is required for demand-supply balance control in the separated system at the time of breaking the route of the link line under a state where a tidal current of the link line is sent from the separated system side to the main system. This control amount is ordinarily selected to be the tidal current of the link line or defined to satisfy an objective frequency deviation. Here, said control amount is the output of the generator 81b.

Figure 4:
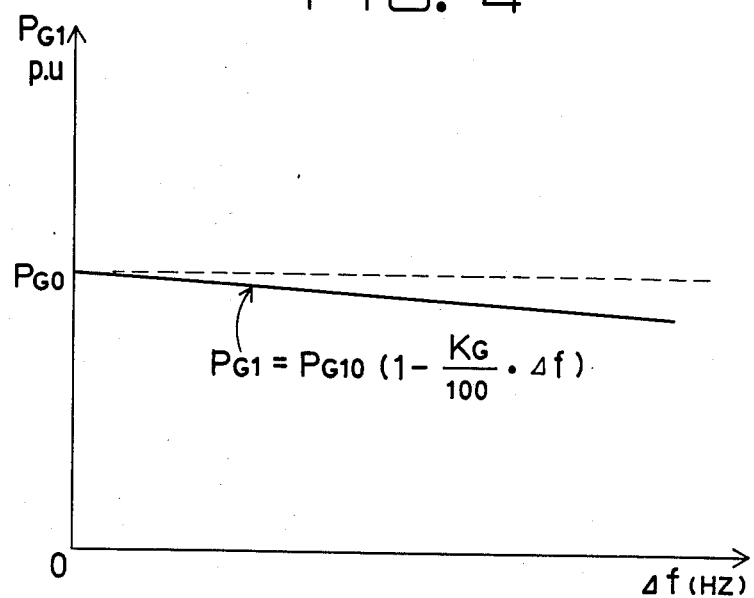
FIG. 4 is a governor-simulation characteristic in the power system stabilizer of one embodiment of the invention, which is realized by embodying the basic principle.

In FIG. 3, $P_{G1}$ denotes a mechanical input to the generator 81a, $M_1$ denotes an inertia constant of the generator 81a; $P_{G2}$ represents a mechanical input to the generator 81b, $M_2$ represents an inertia constant of the generator 81b, Pdrop shows an effective power component of the load 82a, $P_L$ shows a effective power component of the load 82b, and $P_T$ indicates a tidal current flowing in the power line 84 (all of these amounts are represented by a unit method based on a system reference capacity). Also, the governor effect of the generator 81a assumes a characteristic as shown in FIG. 4 and is represented by Equation (3).

$$P_{G1} = P_{G10}\left(1 - \frac{K_G}{100} \cdot \Delta f\right) \quad (3)$$

Figure 5:
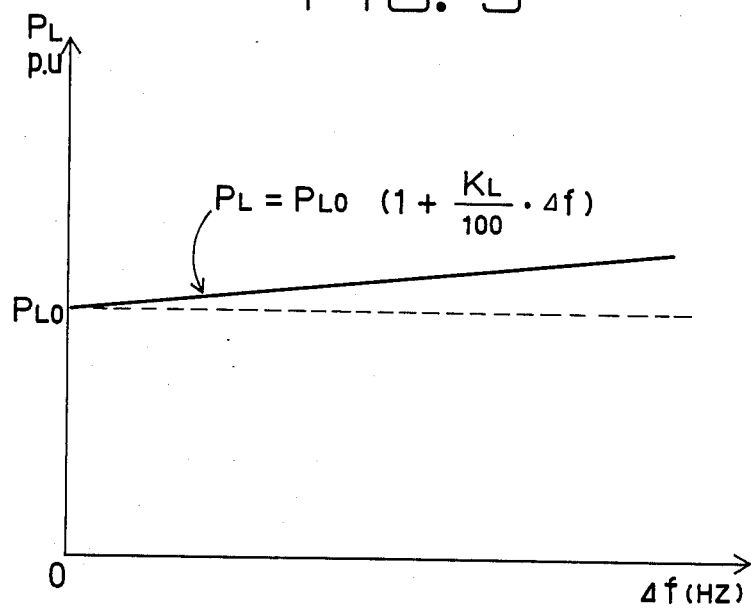
FIG. 5 shows a diagram of a load-simulation characteristic in one embodiment of the invention.
Figure 6:
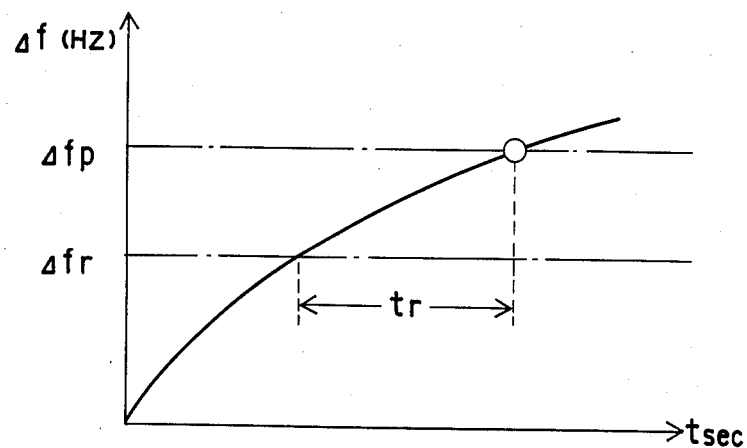
FIG. 6 is a diagram for describing parameters used by the load-drop assumption.

One the other hand, a frequency characteristic of the load 82b becomes the one as shown in FIG. 5 and is represented by Equation (4).

$$P_L = P_{L0}\left(1 + \frac{K_L}{100} \cdot \Delta f\right) \quad (4)$$

where
$K_G$; a frequency characteristic constant of a a generation force [%/Hz]
$K_L$; a frequency characteristic constant of a a load [%/Hz]
$\Delta f$; a deviation [Hz] from a reference frequency suffix 0; a value (initial value) before a state change (system separation)

These $K_G$ and $K_L$ are values almost necessarily defined by the system. In addition, the approximation of the governor effect by Equation (3) is almost established within the range of four to five seconds after the state change.

It is assumed now that a route disconnection of the power line 84, a drop of the load 82a, and breaking for the power generator 81b take place. Specifically, if the switches 83a, 83b and 83c are opened simultaneously, a frequency response in the system is almost controlled by a differential equation shown in Equation (5).

$$\frac{M_1}{f_b} \cdot \frac{d\Delta f}{dt} = P_{G1} - P_L \qquad (5)$$

$$= P_{G10}\left(1 - \frac{K_G}{100}\Delta f\right) - P_{L0}\left(1 + \frac{K_L}{100}\Delta f\right)$$

where $f_b$ is a system reference frequency. Meanwhile, since $$P_{G10} + P_{G20} = P_T + P_{drop} + P_{L0} \qquad (6)$$

is established, the initial state before the state change, $$R_u = \frac{P_T + P_{drop} - P_{G20}}{P_{G10} + P_{G20} - P_{G20}} = \frac{P_{G10} - P_{L0}}{P_{G10}} \qquad (7)$$

is established if $R_u$ is assumed to be a value obtained by normalizing a demand-supply unbalance component in the separated system after the occurrence of separation with a separated system capacity.

By modifying and arranging Equation (5) by the use of the relationship of said Equation (7), $$\frac{1}{f_0} \cdot \frac{M_1}{P_{G10}} \cdot \frac{d\Delta f}{dt} + \{K_G + K_L(1 - R_u)\} \cdot \frac{\Delta f}{100} = R_u \qquad (8)$$

is obtained.

By solving this Equation (8) under the initial condition $\Delta f(0) = 0$ Hz, $$\Delta f(t) = \qquad (9)$$

$$\frac{100 R_u}{K_G + K_L(1 - R_u)} \left[ 1 - e^{-\frac{P_{G10}}{M_1} \cdot \frac{f_b}{100} \{K_G + K_L(1-R_u)\}t} \right]$$

is established.

Assuming now that when $t_r$ seconds has elapsed after the frequency deviation $\Delta f$ in the separate system exceeds a certain prescribed value $\Delta f_r$, a frequency deviation is $\Delta f_p$, this value is given from Equation (9) as follows:

$$\Delta f_p = \frac{100 R_u}{K_G + K_L(1 - R_u)} - \qquad (10)$$

$$\left(\frac{100 R_u}{K_G + K_L(1 - R_u)} - \Delta f_r\right) e^{-\frac{P_{G10}}{M_1} \cdot \frac{f_b}{100} \{K_G + K_L(1-R_u)\}t_r}$$

Figure 7:
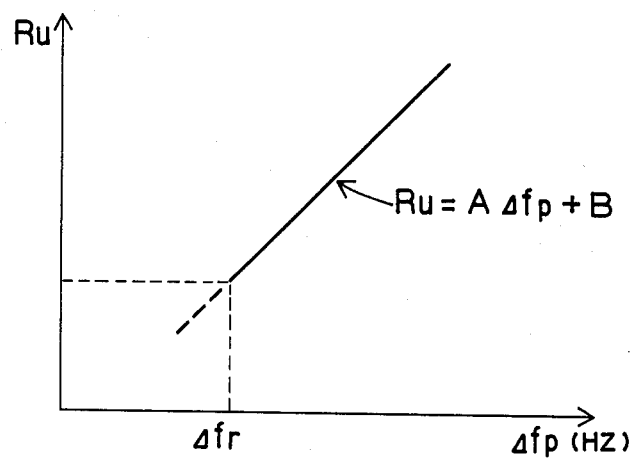
FIG. 7 is a conceptional diagram for describing a load-drop-assumption characteristic.

It can easily be understood from Equation (10) that the frequency deviation $\Delta f_p$ is necessarily determined for said $R_u$ if the operation state of the generator in the separated system, that is, $P_{G10}/M_{hd}$ 1 is kept un-changed. The relationship of both is given by a linear equation as shown in FIG. 7. Therefore, by taking an approximation of the relationship between the frequency deviation $\Delta f_p$ and $R_u$ obtained by normalizing with the separated system capacity the demand-supply unbalance component in the separated system after the generation of separation like $$R_u = A\Delta f_p + B \qquad (11)$$

(where A and B are constants) and by performing the online setting of the approximation thus taken based on the use of Equation (10), $R_u$ is immediately obtained from the frequency deviation $\Delta f_p$ of a representative power station when the system separation occurs. Moreover, the assumption value Pdrop of a load-drop amount is calculated from the relationship of Equation (7) by $$P_{drop} = P_{G10} \cdot R_u - P_T + P_{G20} \qquad (12)$$

Here, since $P_{G10}$, $P_{G20}$ and $P_T$ can be set before a state change as prior information, only $\Delta f_p$ is needed as online data after the state change.

Next, one embodiment of the system stabilizer based on the above-mentioned load-drop-assumption principle and the operation thereof will be described referring to the drawings.

Figure 8:
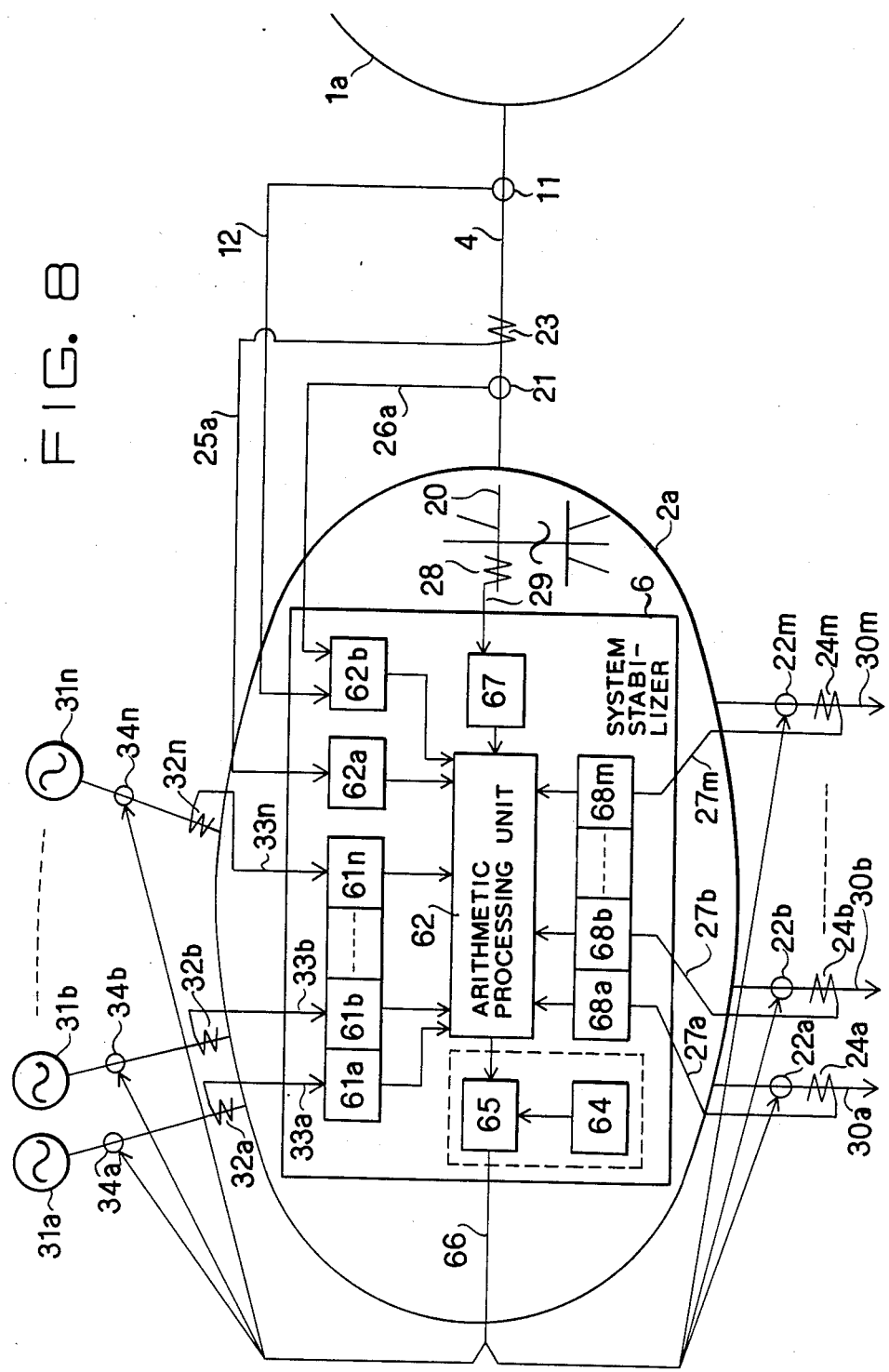
FIG. 8 shows a block diagram for illustrating a structure of the power system stabilizer of one embodiment of the invention.

In FIG. 8, an entire system comprises a main system 1a; a breaker 11 of a link line 4 belonging to the main system side; a communication route 12 for transmitting information of the breaker 11 to a system stabilizer; a separated system 2a to be controlled; a bus 20 of a representative power station belonging to the separated system 2a side; a link line breaker 21 belonging to the separated system 2a side; feeder breakers 22a to 22m of loads to be controlled in the separated system 2a; a power sensor 23 composed of an potential transformer PT for measuring a tidal current of the link line 4 and a current transformer CT; power sensors 24a to 24m, each of which is made up of PT and CT for measuring effective power components of the loads to be controlled in the separated system; a communication route 25a for transmitting tidal current data of the link line to the system stabilizer; a communication route 26a for transmitting information of the breaker 21 to the system stabilizer; communication routes 27a to 27m for transmitting effective power data of the loads to be controlled to the system stabilizer; a sensor 28 for measuring a frequency of the representative power station; a control cable 29 for inputting the frequency of the representative power station into the system stabilizer; a group of loads 30a to 30m to be controlled in the separated system; all generators 31a to 31n belonging to the separated system; power sensors 32a to 32n, each of which is composed of the transformers PT and CT for measuring effective power outputs of the generators belonging to the separated system; communication routes 33a to 33n for transmitting effective power output data of the generators belonging to the separated system to the system stabilizer; breakers 34a to 34n for trip of the generators belonging to the separated system; and said link line 4 for interconnecting the separated system 2a and the main system 1a.

A system stabilizer 6 is installed at the representative power station in the separated system, and comprises input conversion circuits 61a to 61n for measuring effective power of the generators, an input conversion circuit 62a for measuring the tidal current of the link line, an input circuit 62b for information of the breakers for the link line, an arithmetic processing unit 63 using a microprocessor, a stopper 64, an output circuit 65 for a trip signal, an input conversion circuit 67 for measuring a frequency of the representative power station, and input conversion circuits 68a to 68m for measuring effective power components of the loads to be controlled. A control trip signal from the system stabilizer is output to the generators to be controlled and the breaker for the loads.

The operation of the present stabilizer will be described next.

Voltage and current data detected by the power sensors 23, 24a to 24m and 32a to 32n, each of which is composed of a potential transformer PT and a current transformer CT, are inputted through communication routes 25a, 27a to 27m and 33a to 33n to the constant system stabilizer. The input conversion circuits 62a, 68a to 68m, 61a to 61n, etc., each of which is made up of a filtering circuit for a harmonic component and a transient oscillation component, an effective power converter for deriving effective power, an A/D converter for converting an analog amount into a digital one etc. calculate a tidal current Ps of the link line, effective power components of the loads to be controlled and effective power outputs of the generators and give them, after being converted into digital amounts to the arithmetic processing unit 63 employing a microprocessor. Voltage data of the bus 20 of the representative power plant detected by the sensor 28, which is composed of a potential transformer PT, is also sent to the input conversion circuit 67 for measuring the frequency of the representative power station, which is constructed by a filtering circuit, a frequency calculating circuit, an A/D converter, etc. through the control cable 29 and output to said unit 63 after being converted into frequency data. On the other hand, information of the breakers 11 and 21 for the link line 4 is inputted to the input circuit 62b through the communication routes 12 and 26a. The input circuit 62b produces a route-disconnection signal to the arithmetic processing unit 63 as soon as the circuit 62b detects the fact that an object system is separated to be brought into a single operation state after a route disconnection has occurred to the link line. The unit 63 performs balance control in the demand-supply relationship in the separated system according to a flow chart shown in FIG. 9. It should be noted here that the flow chart of FIG. 9 takes an example of the case where generator-breaking is executed for demand-supply balance control in the separated system under a state in which a tidal current is sent from the separated system.

Figure 9:
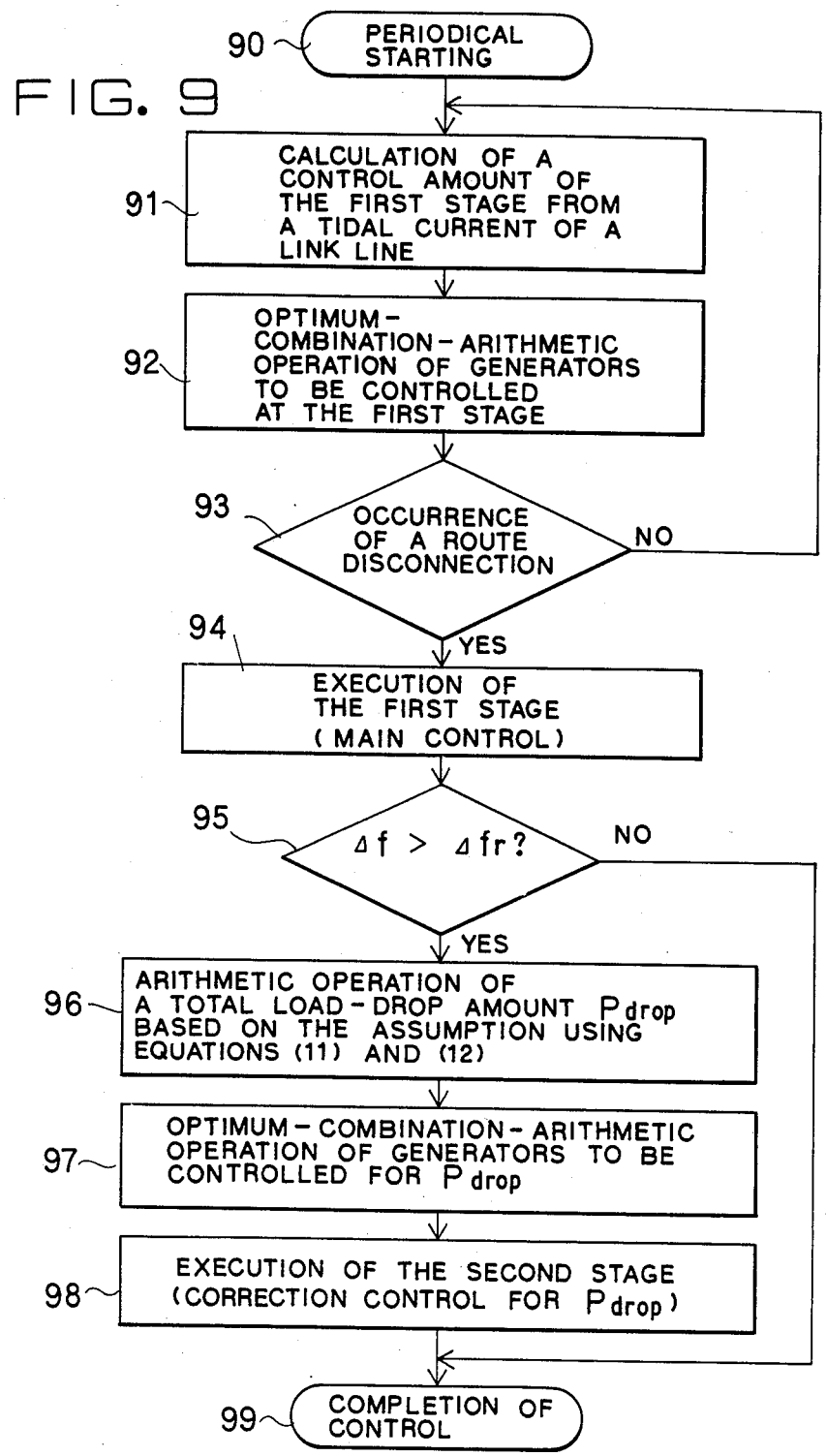
FIG. 9 is a processing flow chart for describing the operation of an arithmetic processing unit in the FIG. 8 structure.

In FIG. 9, an initial block 90 periodically started calculates a control amount of the first stage. A processing block 91 calculates the amount of the first stage on the basis of tidal current data of the link line. A processing block 92 performs an optimum-combination-arithmetic operation of the generators to be controlled at the first stage in compliance with the control amount calculated by the block 91. A control pattern selected at the block 92 is held until it is uptated at the next period. A judgement block 93 judges whether a route disconnection has occurred. In response to the detection of the generation of the route disconnection, control immediately goes to a processing block 94 for executing the control of the first stage. A judgement block 95 judges whether or not the frequency of the representative power station exceeds a prescribed deviation value $\Delta f_r$, and in the case where said frequency does not exceed that value, the control is completed. In contrast, if said frequency exceeds said prescribed deviation value $\Delta f_r$, control moves to a processing block 96 for calculating a total load drop Pdrop on the basis of the assumption using Equations (11) and (12). A processing block 97 performs an optimum-combination -arithmetic operation of the generators to be controlled corresponding to the Pdrop. The generators selected in the block 97 are broken in a processing block 98 for carrying out the control of the second stage. A completion block 99 terminates said series of control.

Figure 10:
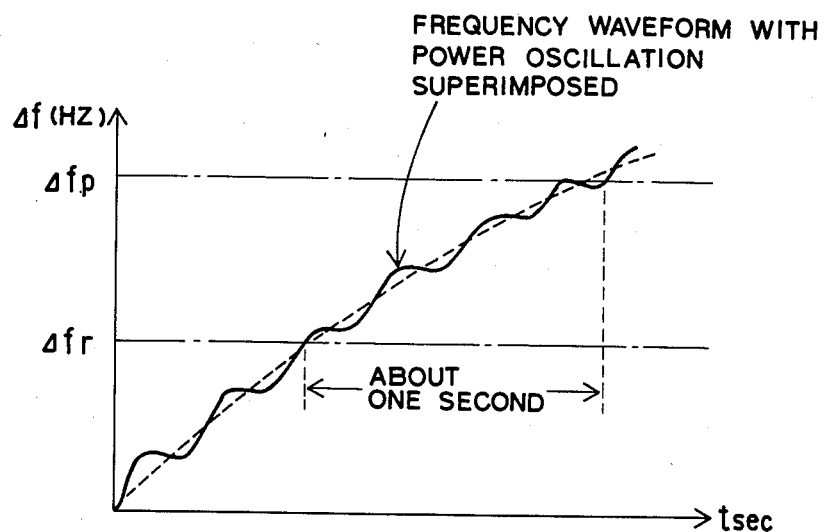
FIG. 10 shows a characteristic diagram for showing frequency measures when power oscillation is superimposed on a frequency waveform in the above-mentioned embodiment.
Figure 11:
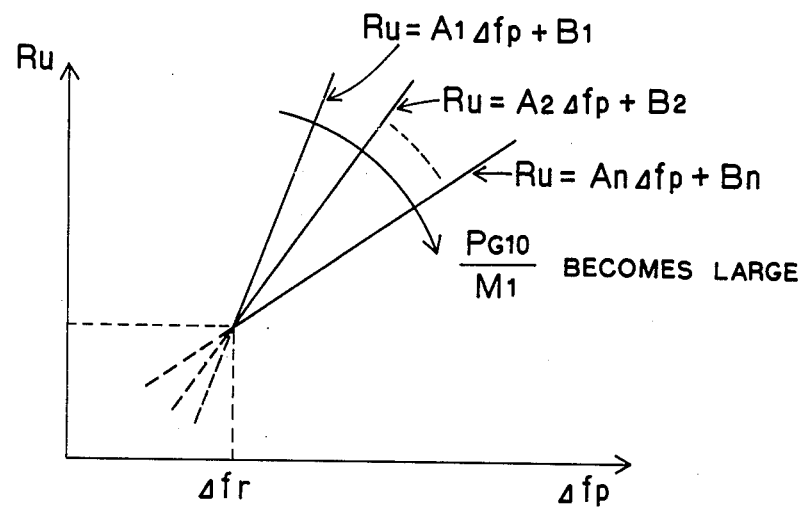
FIG. 11 shows a characteristic diagram for showing measures for a state of a generator change when an operation state of the generator widely varies in the above embodiment.

It should be noted that the prescribed frequency deviation $\Delta f_p$ may be set at values ranging from 0.3 to 0.5 Hz in view of the frequency for guaranteeing a continuous operation of a turbogenerator and a governor blind section, etc. In addition, by selecting a time changing from $\Delta f_r$ to $\Delta f_p$ to be about one second as shown in FIG. 10, the assumption of a load drop can be achieved with high accuracy by a filtering effect even if power oscillation is superimposed on frequency oscillation. In the case where the operation state of the generator, or $P_{G10}/M_1$ in Equation (10) widely varies with the season and time zone, this problem can be solved by providing several load-drop assumption curves corresponding to those varying values as shown in FIG. 11. In this way, such load-drop assumption depending on the operation state of the generator can be done, because both $P_{G10}$ and $M_1$ are known beforehand as information. Clearly, by the use of the system stabilizer 6, the frequency in the separated system 2a remains almost unchanged without being affected by the power station, and the demand-supply unbalance component in the separated system 2a is normalized. For this reason, the relationship between a value in a certain time after said frequency has exceeded a prescribed value and said normalization value can almost necessarily be defined. By paying attention to this relationship, the load-drop amount is assumed on the basis of the relationship between a change in said frequency and a demand-supply unbalance amount to perform correction control for stabilizing the separated system.

Although the above-mentioned embodiment has been directed to the case where the generator is broken by a transmission tidal current of the link line, the present invention can be applied to the case where load-breaking is embodied in the form of demand-supply balance control in the separated system by a reception tidal current of the link line. In this case, based on a similar idea, a load-drop amount is assumed from the frequency of the representative power station so that thus assumed amount can be reflected in the control. However, in such a case, the form of one stage control for performing necessary control at the stage of the completion of the load-drop assumption is desirable rather than the form of two-stage control for performing correction control for a load-drop component after the execution of the first stage control as with the case of the transmission tidal current (this is because the execution of generator-breaking is necessary in the case of a great amount of load drop amount).

Moreover, though the load-drop assumption has been made using the frequency deviation $\Delta f_p$ in the constant time $t_r$ (seconds) after the frequency of the representative power station exceeds the prescribed deviation value $\Delta f_r$ in the above embodiment, similar load-drop assumption may be performed employing a peak value of the frequency, a stationary frequency deviation, etc.

As has been described above, since the power system stabilizer of the invention carries out the assumption of a total load-drop amount of a separated power system by a simple linear equation using the frequency after the breaking accident has been eliminated at the representative power station of the power system separated due to the accident of the link line and then controls a power demand-supply balance based on said assumption amount, the load-drop assumption of the power system can be made without using a load-node voltage. As a result, the present invention is applicable to a system having a large number of stations and nodes.

Furthermore, the load-drop assumption in said separated power system can be carried out using a simple assumption equation, the structure of arithmetic processing means may be simplified to allow the accuracy of a quick response to be maintained or to be improved, and as a result, the power system stabilizer having almost no malfunction and an inexpensive manufacturing cost can be presented.

What is claimed is:

1. A power system stabilizer provided at an individual power system which is to be separated (a separated system) due to an accident cutting off a link line which interconnects a plurality of individual power systems to form a large-scale power system (main system), said plurality of individual power systems including power stations such as power plants, transformer substations and loads, the power system stabilizer comprising:

arithmetic processing means for assuming a total load-drop amount of the separated system caused by a voltage drop during said accident by an arithmetic operation based on a difference between a frequency in a representative power station belonging to said separated system and a frequency at a constant time after the frequency in said representative power station has exceeded a prescribed value; and control means for controlling a balance in demand and supply at each power station in said separated system on the basis of an assumption amount obtained by said operation of the arithmetic processing means.

2. A power system stabilizer as claimed in claim 1 wherein said arithmetic processing means performs an arithmetic processing of a load drop $P_{drop}$ of the separated system for an amount $R_u$ obtained by normalizing a capacity of the separated system when $P_{G10}/M_1$ is constant, wherein $\delta f$ is a frequency deviation in said separated system; $\Delta f_p$ is a frequency deviation in the system in $t_r$ seconds after the frequency deviation $\Delta f$ has exceeded a prescribed value $\Delta f_r$, said arithmetic processing being made based on the following equation:

$$\Delta f_p = \frac{100 \cdot R_u}{K_G + K_L(1 - R_u)} \left( \frac{100 \cdot R_u}{K_G + K_L(1 - R_u)} - \Delta f_r \right) e^{-\frac{P_{G10}}{M_1} \cdot \frac{f_b}{100} \{K_G + K_L(1-R_u)\} t_r}$$

$$R_u = A \cdot \Delta f_p + B$$

$$P_{drop} = P_{G10} \cdot R_u - P_T + P_{G20}$$

where:
$R_u$; an amount obtained by normalizing a demand-supply unbalance component in the separated system after the generation of separation (cutting-off accident) by the separated system;

$K_G$; a frequency characteristic constant of a generation force;

$K_L$; a frequency characteristic constant of a load;

Mhd 1; a characteristic constant of a generator placed out of control;

A, B; constants;

$P_{G10}$; a mechanical input of the generator placed out of control at a first stage before a state change;

$P_{G20}$; a mechanical input of the generator to be controlled at the first stage;

$P_T$; a tidal current of effective power;

$f_b$; a system reference frequency.

3. A power system stabilizer as claimed in claim 1, wherein said arithmetic processing means is composed of an arithmetic processing unit employing a microprocessor.

4. A power system stabilizer as claimed in claim 1, wherein said control means controls to maintain a balance between a supply side and a demand side by producing a control signal to a breaker for breaking an electrical connection of the individual power stations provided in said separated system with the main system on the basis of an arithmetic operation result produced from said arithmetic processing means.

5. A power system stabilizer as claimed in claim 4, wherein said control means provides an output signal to a generator provided in said separated system and a breaker for breaking an electrical connection with said main system.

6. A power system stabilizer as claimed in claim 4, wherein said control means provides said control signal to various loads provided in said separated system and a feeder breaker for breaking an electrical connection with the separated system.

* * * * *

UNITED STATES PATENT AND TRADEMARK OFFICE
CERTIFICATE OF CORRECTION

PATENT NO. : 4,785,405

DATED : November 15, 1988

INVENTOR(S) : TAIZO HASEGAWA ET AL.

It is certified that error appears in the above-identified patent and that said Letters Patent is hereby corrected as shown below:

Front Page, [73], line 1, after "Inc." insert --, Aichi--.
Front page, [57], line 1, "The" should be --A--.
Col. 1, line 48, "a" should be --an--.
Col. 2, line 1, "route -disconnection" should be --route-disconnection--;
Col. 2, lines 25-28, delete in their entirety and insert the following:

$$\dot{P}_L^* = [P_{LP}^* P_{LI}^* P_{LZ}^*]^t$$

$$= (\dot{V}_L^t R^{-1} \dot{V}_L)^{-1} (\dot{V}_L^t R^{-1}) \dot{P}_G \qquad \ldots (1)$$

UNITED STATES PATENT AND TRADEMARK OFFICE
CERTIFICATE OF CORRECTION

PATENT NO. : 4,785,405
DATED : November 15, 1988
INVENTOR(S) : TAIZO HASEGAWA ET AL.

It is certified that error appears in the above-identified patent and that said Letters Patent is hereby corrected as shown below:

Col. 2, lines 35-48, delete in their entirety and insert the following:

$$\dot{P}_G = [P_{G1} P_{G2} \cdots P_{Gn}]^t$$

$$\dot{V}_L = \begin{bmatrix} 1 & V_{L1} & V_{L1}^2 \\ 1 & V_{L2} & V_{L2}^2 \\ \vdots & \vdots & \vdots \\ 1 & V_{Ln} & V_{Ln}^2 \end{bmatrix}$$

$$\dot{P}_L = [P_{LP} P_{LI} P_{LZ}]^t ;$$

Col. 2, line 50, "=Ps-Pdrop" should be -- = Ps-Pdrop$^*$ --.

UNITED STATES PATENT AND TRADEMARK OFFICE
CERTIFICATE OF CORRECTION

PATENT NO. : 4,785,405
DATED : November 15, 1988
INVENTOR(S) : TAIZO HASEGAWA ET AL.

It is certified that error appears in the above-identified patent and that said Letters Patent is hereby corrected as shown below:

Col. 4, line 42, "a" should be --an--;
Col. 4, line 43, "load" should be --load--;
Col. 4, line 54, "One" should be --On--;
Col. 4, line 64, delete "a" (third occurrence);
Col. 4, line 66, delete "a" (third occurrence).
Col. 5, line 12, "constrolled" should be --controlled--;
Col. 5, lines 45-50, delete in their entirety and insert the following:

$$\Delta f(t) = \frac{100 R_u}{K_G + K_L (1-R_u)} \left[ 1 - e^{-\frac{P_{G10}}{M_1} \cdot \frac{f_b}{100} \{K_G + K_L (1-R_u)\} t} \right] \quad \ldots (9)$$

UNITED STATES PATENT AND TRADEMARK OFFICE
CERTIFICATE OF CORRECTION

PATENT NO. : 4,785,405
DATED : November 15, 1988
INVENTOR(S) : TAIZO HASEGAWA ET AL.

It is certified that error appears in the above-identified patent and that said Letters Patent is hereby corrected as shown below:

Col. 5, lines 60-64, delete in their entirety and insert the following:

$$\Delta f_p = \frac{100 R_u}{K_G + K_L(1-R_u)} - \{\frac{100 R_u}{K_G + K_L(1-R_u)} - \Delta f_r\} e^{-\frac{P_{G10}}{M_1} \cdot \frac{f_b}{100}\{K_G + K_L(1-R_u)\} t_r} \quad \ldots (10)$$

Col. 5, line 68, "$P_{g10}$Mhd 1" should be --$P_G 10/M_1$--.
Col. 6, line 16, "load -drop" should be --load-drop--;
Col. 6, line 20, "$\overset{*}{P}$drop" should be --pd$\overset{*}{\text{ro}}$p--.
Col. 8, line 4, "Ufr" should be --$\Delta f_r$--;
Col. 8, line 8, "optimum-combination - arithmetic" should be --optimum-combination-arithmetic--;
Col. 8, line 15, "Uf$_p$" shoudl be --$\Delta f_r$--.

UNITED STATES PATENT AND TRADEMARK OFFICE
CERTIFICATE OF CORRECTION

PATENT NO. : 4,785,405
DATED : November 15, 1988
INVENTOR(S) : TAIZO HASEGAWA ET AL.

It is certified that error appears in the above-identified patent and that said Letters Patent is hereby corrected as shown below:

Col. 10, line 3, "wherein 66" should be --where $\Delta$--;
Col. 10, line 7, "equation" should be --equations--;
Col. 10, line 10, "PG10" should be --$PG_{10}$--;
Col. 10, line 10, "fb" should be --$f_b$--;
Col. 10, line 10, "tr" should be --$t_r$--;
Col. 10, line 25, "Mhd 1" should be --$M_1$--;
Col. 10, line 41, "ducing" should be --viding--.

Signed and Sealed this

Ninth Day of April, 1991

Attest:

HARRY F. MANBECK. JR.

*Attesting Officer*   Commissioner of Patents and Trademarks